US009070321B2

(12) United States Patent
Li et al.

(10) Patent No.: US 9,070,321 B2
(45) Date of Patent: Jun. 30, 2015

(54) TABLET COMPUTER AND METHOD FOR CONTROLLING THE SAME

(71) Applicants: Maintek Computer (Suzhou) Co., Ltd, JiangSu (CN); PEGATRON CORPORATION, Taipei (TW)

(72) Inventors: Xiao-Wei Li, JiangSu (CN); Chien-Jung Tu, Taipei (TW)

(73) Assignees: Maintek Computer (Suzhou) Co., Ltd, JiangSu (CN); PEGATRON CORPORATION, Taipei (TW)

( * ) Notice: Subject to any disclaimer, the term of this patent is extended or adjusted under 35 U.S.C. 154(b) by 15 days.

(21) Appl. No.: 14/058,303

(22) Filed: Oct. 21, 2013

(65) Prior Publication Data

US 2014/0160042 A1 Jun. 12, 2014

(30) Foreign Application Priority Data

Dec. 12, 2012 (CN) .......................... 2012 1 0536258

(51) Int. Cl.
*G06F 3/045* (2006.01)
*G09G 3/20* (2006.01)

(52) U.S. Cl.
CPC .............. *G09G 3/20* (2013.01); *G09G 2370/14* (2013.01)

(58) Field of Classification Search
CPC ............................ G09G 2370/14; G09G 3/20
USPC .......... 386/334, 335, 284; 345/173–178, 204, 345/520
See application file for complete search history.

(56) References Cited

U.S. PATENT DOCUMENTS

| | | | | |
|---|---|---|---|---|
| 2007/0176936 | A1* | 8/2007 | Cho | 345/520 |
| 2008/0018789 | A1* | 1/2008 | Lin | 348/552 |
| 2010/0318709 | A1 | 12/2010 | Bell et al. | |
| 2012/0162908 | A1 | 6/2012 | Lo et al. | |
| 2014/0118367 | A1* | 5/2014 | Chen et al. | 345/520 |
| 2014/0267074 | A1* | 9/2014 | Balci et al. | 345/173 |
| 2014/0297897 | A1* | 10/2014 | Halim et al. | 710/14 |

FOREIGN PATENT DOCUMENTS

| | | | |
|---|---|---|---|
| CN | 101770310 | A | 7/2010 |
| JP | 2005-284886 | | 10/2005 |
| JP | 2011-108226 | | 6/2011 |
| TW | 592366 | U | 6/2004 |
| TW | 200807290 | A | 2/2008 |
| TW | M419166 | | 12/2011 |
| WO | 2011132652 | A1 | 10/2011 |

* cited by examiner

*Primary Examiner* — Kent Chang
*Assistant Examiner* — Nelson Rosario
(74) *Attorney, Agent, or Firm* — CKC & Partners Co., Ltd.

(57) ABSTRACT

The present invention discloses a tablet computer and a method for controlling the same. The method includes steps of receiving a first video signal outputted from an external device; converting the first video signal into a first low voltage differential signal; receiving a second video signal outputted from a processor; converting the second video signal into a second low voltage differential signal; making the tablet computer selectively operate in a tablet computer mode or an external device mode; outputting the second low voltage differential signal to a display module to display corresponding data when the tablet computer operates in the tablet computer mode; and outputting the first low voltage differential signal to the display module to display corresponding data when the tablet computer operates in the external device mode.

8 Claims, 7 Drawing Sheets

| Switching signal | Relation between input and output terminal | Operation mode |
|---|---|---|
| L | $An=nB_1$ | Tablet computer mode |
| H | $An=nB_2$ | External device mode |

Fig. 3B

| | Tablet computer mode | External device mode |
|---|---|---|
| HPD | LOW | High |
| Keyboard | NO | OK |
| Touching function | OK | OK |

Fig. 4

TABLET COMPUTER AND METHOD FOR CONTROLLING THE SAME

RELATED APPLICATIONS

This application claims priority to China Application Serial Number 201210536258.4, filed Dec. 12, 2012, which is herein incorporated by reference.

BACKGROUND

1. Technology Field

The embodiment of the present invention relates generally to a computer and method for controlling the same and, more particularly, to a tablet computer and method for controlling the same.

2. Description of Related Art

Due to their portability, tablet computers are increasingly gaining in popularity. However, in contrast to the powerful hardware configurations of notebook computers, the hardware configurations of tablet computers are lacking. Therefore, it may be necessary for users to connect their tablet computers to notebook computers in order to use the powerful hardware configurations and the operating systems of the notebook computers.

However, the display signal formats which can be accepted by a tablet computer are low voltage differential signals. Therefore, if it is desired to connect a tablet computer to a notebook computer for use of the operating system of the notebook computer by the tablet computer, it is necessary to equip the notebook computer with special hardware. As a result, a tablet computer can only cooperate in this manner with a special notebook computer, and this adversely affects the portability of tablet computers since not all notebook computers can be used for such connection.

SUMMARY

A tablet computer and method for controlling the same are provided which address the problem of conventional controlling method only enabling switching between compatible notebook computers and tablet computers. Hence, the tablet computer can be used as a display device essentially for any kind of external device.

One aspect of the embodiment of the present invention is related to a method for controlling a tablet computer. The tablet computer has a processor and a display module, and is capable of selectively operating in a tablet computer mode or an external device mode. The controlling method includes the steps of receiving a first video signal outputted from an external device; converting the first video signal into a first low voltage differential signal; receiving a second video signal outputted from the processor; converting the second video signal into a second low voltage differential signal; and outputting the second low voltage differential signal to the display module to display corresponding data when the tablet computer operates in the tablet computer mode, and outputting the first low voltage differential signal to the display module to display corresponding data when the tablet computer operates in the external device mode.

In one embodiment of the present invention, the step of making the tablet computer selectively operate in the tablet computer mode or the external device mode includes the step of receiving a switching signal outputted from the processor to make the tablet computer operate in the external device mode.

In another embodiment of the present invention, the step of making the tablet computer selectively operate in the tablet computer mode or the external device mode includes the steps of detecting whether the tablet computer is connected to the external device; and when the tablet computer is connected to the external device, making the tablet computer operate in the external device mode.

In yet another embodiment of the present invention, the method for controlling the tablet computer includes the steps of receiving a touch signal; and when the tablet computer operates in the tablet computer mode, outputting the touch signal to the processor, and when the tablet computer operates in the external device mode, outputting the touch signal to the external device.

Another aspect of the embodiment of the present invention is related to a tablet computer. The tablet computer includes an external device input interface, a first low voltage differential signal converter, a processor, a second low voltage differential signal converter, a low voltage differential signal switch, and a display module. The external device input interface is configured for connecting to an external device and receiving a first video signal outputted from the external device. The first low voltage differential signal converter is electrically coupled to the external device input interface and configured for converting the first video signal into a first low voltage differential signal. The processor is configured for outputting a second video signal. The second low voltage differential signal converter is electrically coupled to the processor and configured for converting the second video signal into a second low voltage differential signal. The low voltage differential signal switch is electrically coupled to the first low voltage differential signal converter and the second low voltage differential signal converter, wherein when the tablet computer operates in a tablet computer mode, the low voltage differential signal switch outputs the second low voltage differential signal, and when the tablet computer operates in an external device mode, the low voltage differential signal switch outputs the first low voltage differential signal. The display module is electrically coupled to the low voltage differential signal switch and configured for displaying corresponding data based on the first low voltage differential signal or the second low voltage differential signal outputted from the low voltage differential signal switch.

In one embodiment of the present invention, when the tablet computer operates in the external device mode, the tablet computer is operated through a processor of the external device.

In another embodiment of the present invention, the display module is a touch display module configured for sensing touch events, and the display module generates a touch signal based on the touch events, wherein the tablet computer further comprises a touch signal switch electrically coupled to the touch display module, the processor, and the external device input interface, and the touch signal switch is configured for receiving the touch signal, wherein when the tablet computer operates in the tablet computer mode, the touch signal switch transmits the touch signal to the processor, and when the tablet computer operates in the external device mode, the touch signal switch transmits the touch signal to the external device via the external device input interface.

In yet another embodiment of the present invention, when the tablet computer operates in the tablet computer mode, the tablet computer is operated through the processor.

In still another embodiment of the present invention, the tablet computer further includes a dip switch. The dip switch is electrically coupled to the processor and configured for controlling the processor to output a switching signal, wherein when the low voltage differential signal switch receives the switching signal, the low voltage differential signal switch changes the tablet computer into the external device mode.

In yet another embodiment of the present invention, the external device input interface is electrically coupled to the low voltage differential signal switch, and the external device input interface comprises a detecting pin configured for detecting whether the external device is connected to the external device input interface, wherein when the external device is connected to the external device input interface, the low voltage differential signal switch changes the tablet computer into the external device mode.

As a result, according to the present invention, the tablet computer of the present invention is equipped with a first low voltage differential signal converter for converting first video signals of external devices into first low voltage differential signals, such that the tablet computer of the present invention can function as a display device for any external device. Consequently, the problem of conventional switch systems only enabling switching between compatible notebook computers and tablet compute is overcome.

BRIEF DESCRIPTION OF THE DRAWINGS

The invention can be more fully understood by reading the following detailed description of the embodiments, with reference made to the accompanying drawings as follows:

FIG. 3B shows a truth table of a low voltage differential signal switch of FIG. 1 according to embodiments of the present invention.

FIG. 4 shows a truth table of a detecting pin of FIG. 1 according to embodiments of the present invention.

Figure 1:
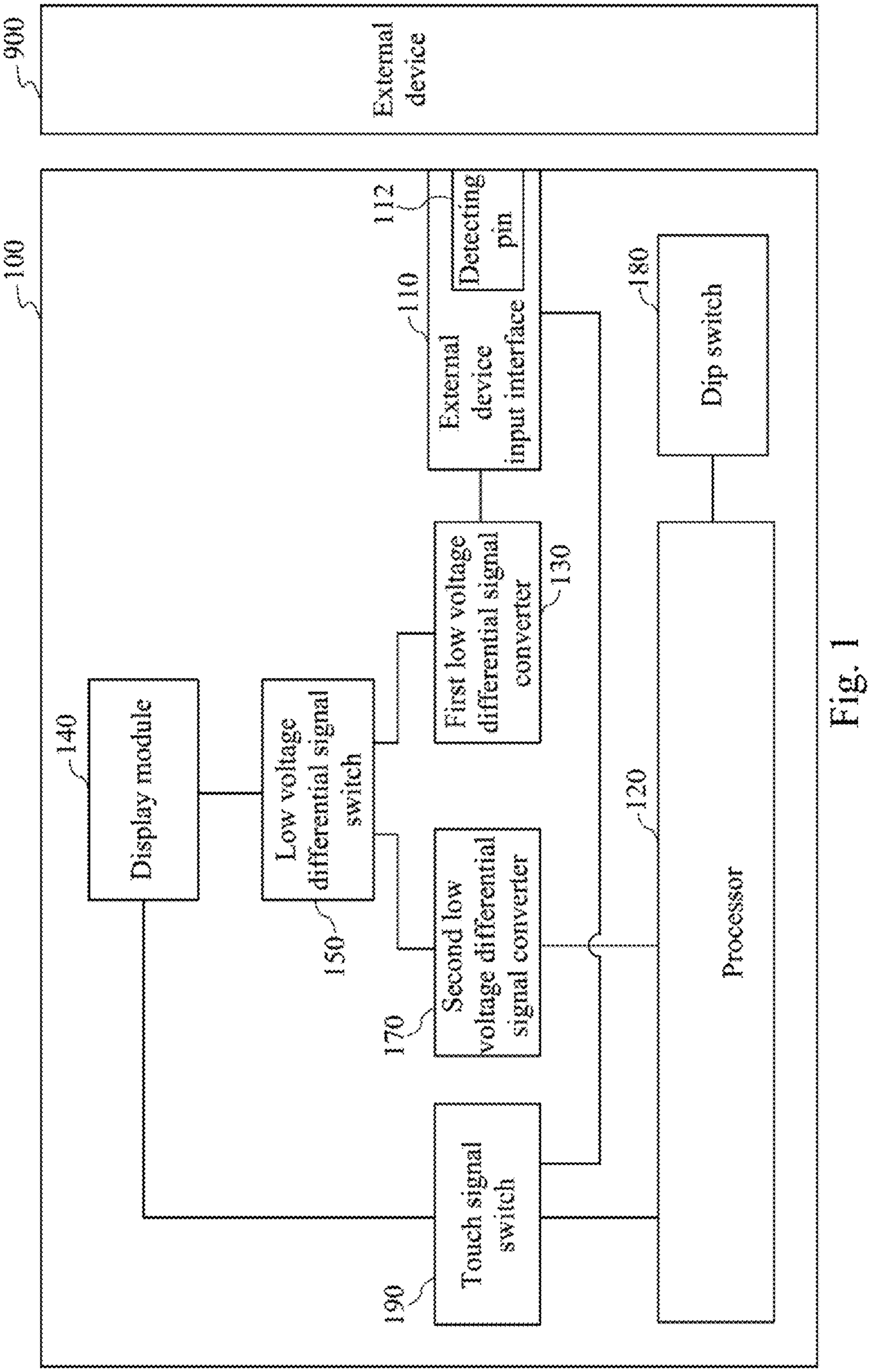
FIG. 1 shows a circuit block diagram of a tablet computer according to embodiments of the present invention.

In accordance with common practice, the various described features/elements are not drawn to scale but instead are drawn to best illustrate specific features/elements relevant to the present invention. Also, like reference numerals and designations in the various drawings are used to indicate like elements/parts.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms “a” and “an” include the plural reference unless the context clearly indicates otherwise. Also, as used herein and in the claims, the terms “at least one” and “one or more” have the same meaning and include one, two, three, or more.

Moreover, as used herein, the terms “couple” or “connect” refer to the physical or electrical contacts between two or more elements with each other, either directly or indirectly, or the mutual operation or interaction between two or more elements.

FIG. 1 shows a circuit block diagram of a tablet computer 100 according to embodiments of the present invention. As shown in FIG. 1, the tablet computer 100 includes an external device input interface 110, a processor 120, a first low voltage differential signal (LVDS) converter 130, a display module 140, a low voltage differential signal switch 150, and a second low voltage differential signal converter 170.

The first low voltage differential signal converter 130 is electrically coupled to the external device input interface 110, the second low voltage differential signal converter 170 is electrically coupled to processor 120, the low voltage differential signal switch 150 is electrically coupled to the first low voltage differential signal converter 130 and the second low voltage differential signal converter 170, and the display module 140 is electrically coupled to the low voltage differential signal switch 150.

The external device input interface 110 is configured for connecting to an external device 900 and receiving a first video signal outputted from the external device 900. The first low voltage differential signal converter 130 is configured for converting the first video signal into a first low voltage differential signal. For example, when the first video signal is a high definition multimedia interface (HDMI) signal, the first low voltage differential signal converter 130 can convert video signals included in the HDMI signal into first low voltage differential signals. Moreover, the first low voltage differential signal converter 130 can transmit audio signals included in the HDMI signal to a corresponding audio playback device, and in this manner, the tablet computer 100 can broadcast the audio signals through its loudspeaker.

In this embodiment, the processor 120 is configured for outputting a second video signal. The second low voltage differential signal converter 170 is configured for converting the second video signal into a second low voltage differential signal.

When implementing this invention, the low voltage differential signal switch 150 can be a 2:1 switch chip of a low voltage differential signal, but the present invention is not limited in this regard. One terminal of the 2:1 switch chip is connected to the first low voltage differential signal converter 130 and the second low voltage differential signal converter 170, and the other terminal of the 2:1 switch chip is connected to the display module 140. When the tablet computer 100 operates in a tablet computer mode, the low voltage differential signal switch 150 outputs the second low voltage differential signal, and when tablet computer 100 operates in an external device mode, the low voltage differential signal switch 150 outputs the first low voltage differential signal.

The display module 140 is configured for displaying corresponding data based on the first low voltage differential signal or the second low voltage differential signal outputted from the low voltage differential signal switch 150.

When any external device 900 is connected to the external device input interface 110, the tablet computer 100 can be switched between the tablet computer mode or the external device mode, thereby addressing the problem of conventional switch systems only enabling switching between compatible notebook computers and tablet computers.

In addition, in this embodiment, when the tablet computer 100 operates in the external device mode, the tablet computer 100 is operated through a processor of the external device 900, and video signals inputted from the external device 900 can be displayed on the display module 140 of the tablet computer 100. Such operation addresses the problem of difficulties in developing hardware resulting from processor configuration differences between the tablet computer 100 and the external device 900.

In this embodiment, the tablet computer 100 can adopt an Android® system, the Windows Mobile® system, the Apple® iOS operating system, and so on. However, compared with conventional computer operating systems, the operational capabilities and functionality of the above-mentioned operating systems are low. To overcome this problem, when the tablet computer 100 of the present invention operates in the external device mode, the tablet computer 100 can use the operating system of the external device 900, such that the operations of the tablet computer 100 can be processed by the powerful processing capability of the external device 900. The external device 900 can be a desktop computer, notebook computer, and so on, but the present invention is not limited in this regard. The operating system of the external device 900 can be a Windows series operating system or Apple series operating system. Moreover, the external device 900 can be a camera, projector, and so on so that the bigger display module 140 of the tablet computer 100 can be used to view pictures or watch videos.

In one embodiment of the present invention, the display module 140 can be a touch display module. In other words, the display module 140 includes a touch detection function. The display module 140 is electrically coupled to the processor 120 and is configured for sensing touch events, and the display module 140 generates touch signals according to the touch events. In addition, the tablet computer 100 further comprises a touch signal switch 190 electrically coupled to the display module 140, the processor 120, and the external device input interface 110, and the touch signal switch 190 is configured for receiving the touch signals. When the tablet computer 100 operates in the tablet computer mode, the touch signal switch 190 transmits the touch signals to the processor 120. When the tablet computer 100 operates in the external device mode, the touch signal switch 190 transmits the touch signals to the external device 900. In this manner, when the tablet computer 100 operates in the external device mode, the touch detection function of the display module 140 of the tablet computer 100 can be used at the same time, and as a result, an external input device (for example, a mouse or a keyboard) is unneeded.

In this embodiment, when the tablet computer 100 operates in the tablet computer mode, the tablet computer 100 uses the internal processor 120 and a corresponding operating system. The operating system can be an Android® system, the Windows Mobile® system, the Apple® iOS operating system, and so on.

In this embodiment, the tablet computer 100 further comprises a dip switch 180. The dip switch 180 is electrically coupled to the processor 120 and configured for controlling the processor 120 to output a switching signal. When the low voltage differential signal switch 150 receives the switching signal, the low voltage differential signal switch 150 changes the tablet computer 100 into the external device mode. When the low voltage differential signal switch 150 does not receive the switching signal, in other words, when the low voltage differential signal switch 150 is in a predetermined condition, the tablet computer 100 will stay in the tablet computer mode.

In another embodiment of the present invention, the change of the operation mode of the tablet computer 100 does not occur as a result of the output of the switching signal from the processor 120. That is, when the external device input interface 110 connects to the external device 900, the tablet computer 100 is changed to the external device mode directly. Specifically, the external device input interface 110 can comprise a detecting pin 112, and the detecting pin 112 is configured for detecting whether the external device 900 is connected to the external device input interface 110. The external device input interface 110 is electrically coupled to the low voltage differential signal switch 150. When the external device 900 is connected to the external device input interface 110, the low voltage differential signal switch 150 can detect the change of the voltage level of detecting pin 112 to change the tablet computer 100 into the external device mode.

Figure 2:
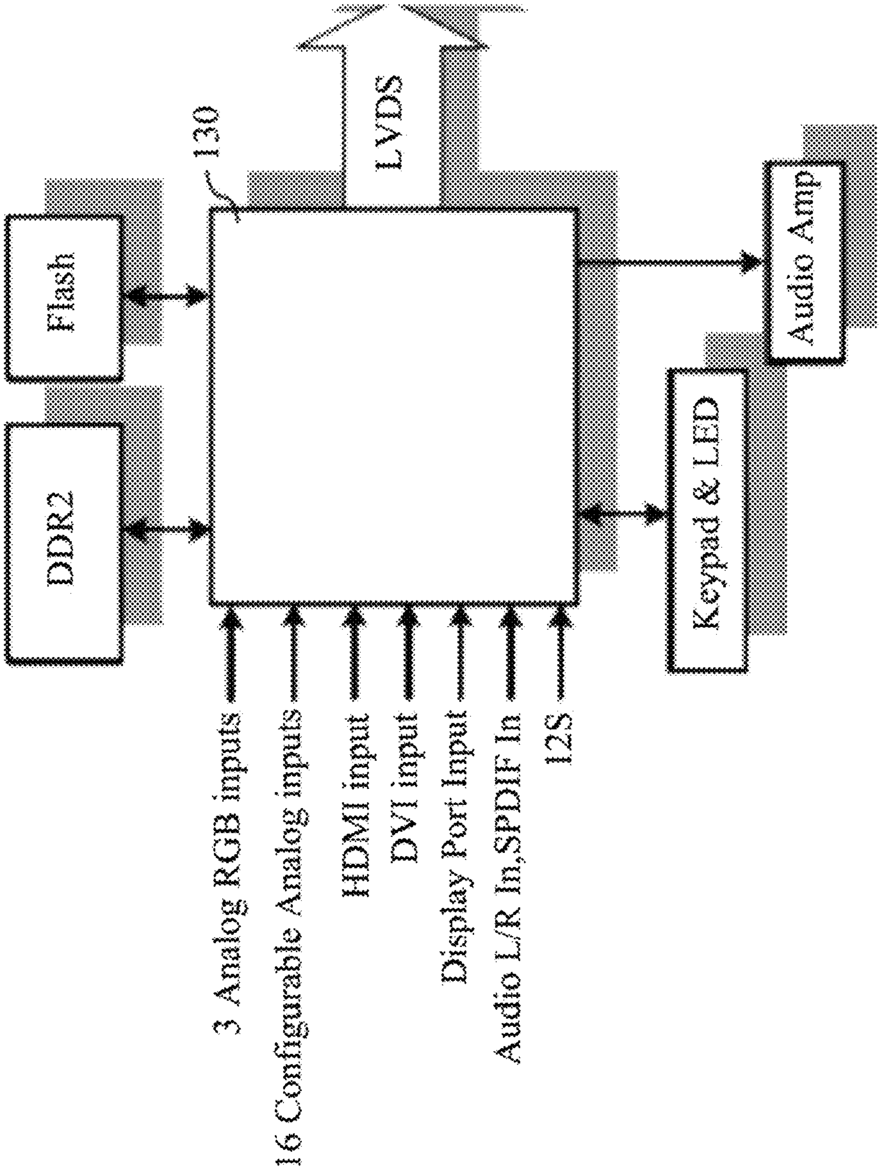
FIG. 2 shows a schematic diagram of a first low voltage differential signal converter of FIG. 1 according to embodiments of the present invention.

FIG. 2 shows a schematic diagram of the first low voltage differential signal converter 130 of FIG. 1 according to embodiments of the present invention. As shown in FIG. 2, the first low voltage differential signal converter 130 can convert different kinds of video signals (for example, HDMI, DVI, RGB, and S video) into low voltage differential signals which can be displayed by the tablet computer 100. Hence, switching to operating systems of all kinds of computers is possible. Furthermore, the tablet computer 100 can function as a display device for all kinds of electronic products, for example, desktop computers, notebook computers, digital cameras, DVs, and projectors.

Figure 3A:
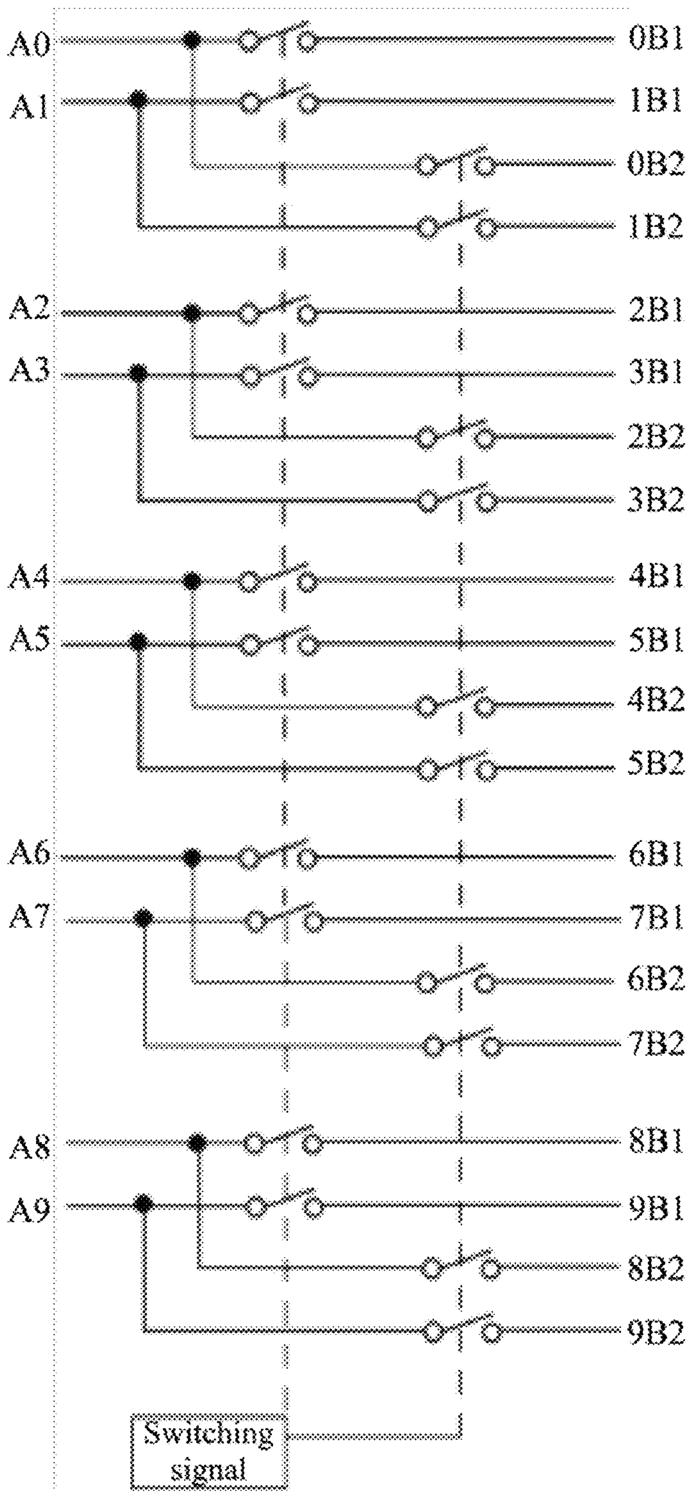
FIG. 3A shows a schematic diagram of a low voltage differential signal switch of FIG. 1 according to embodiments of the present invention.

FIG. 3A shows a schematic diagram of the low voltage differential signal switch 150 of FIG. 1 according to embodiments of the present invention. As shown in FIG. 3A, the embodiment of the low voltage differential signal switch 150 of the present invention can be implemented by this circuit structure. FIG. 3B shows a truth table of the low voltage differential signal switch 150 of FIG. 1 according to embodiments of the present invention. As shown in FIG. 3B, when the switching signal is at a logic low level (L), the relation between the input terminal and the output terminal is $A_n = nB_1$. For example, signals are inputted from A0 and outputted from 0B1, and if signals are inputted from A1, then the signals are outputted from 1B1, and so on. At this time, the tablet computer 100 operates in the tablet computer mode. In addition, when the switching signal is at logic high level (H), the relation between the input terminal and the output terminal is $A_n = nB_2$. For example, signals are inputted from A0 and outputted from 0B2, and if signals are inputted from A1 then the signals are outputted from 1B2, and so on. At this time, the tablet computer 100 operates in the external device mode. However, the present invention is not intended to be limited in this regard, and those of ordinary skill in the art can selectively adopt appropriate structures to accomplish the low voltage differential signal switch 150, and establish appropriate truth tables corresponding to such structures.

FIG. 4 shows a truth table of the detecting pin 112 of FIG. 1 according to embodiments of the present invention. As shown in FIG. 4, when the tablet computer 100 is turned on, the initial value of the Hot plug Detect (HPD) signal of the detecting pin 112 is LOW which indicates that there is no external device 900 connected to the external device input interface 110. At this time, the tablet computer 100 uses the internal operating system. When the external device 900 is connected to the external device input interface 110, for example, the HDMI or the Digital Visual Interface (DVI) of the external device 900 plugs into the external device input interface 110, the HPD signal of the detecting pin 112 is changed to a high state, such that the operating system will be changed. For example, as shown in FIG. 4, when the tablet computer 100 operates in the tablet computer mode, an externally connected keyboard cannot be used. However, the touch function of the tablet computer 100 can be used. In addition, when the tablet computer 100 operates in the external device mode, the externally connected keyboard and the touch function of the tablet computer 100 can both be used.

Figure 5:
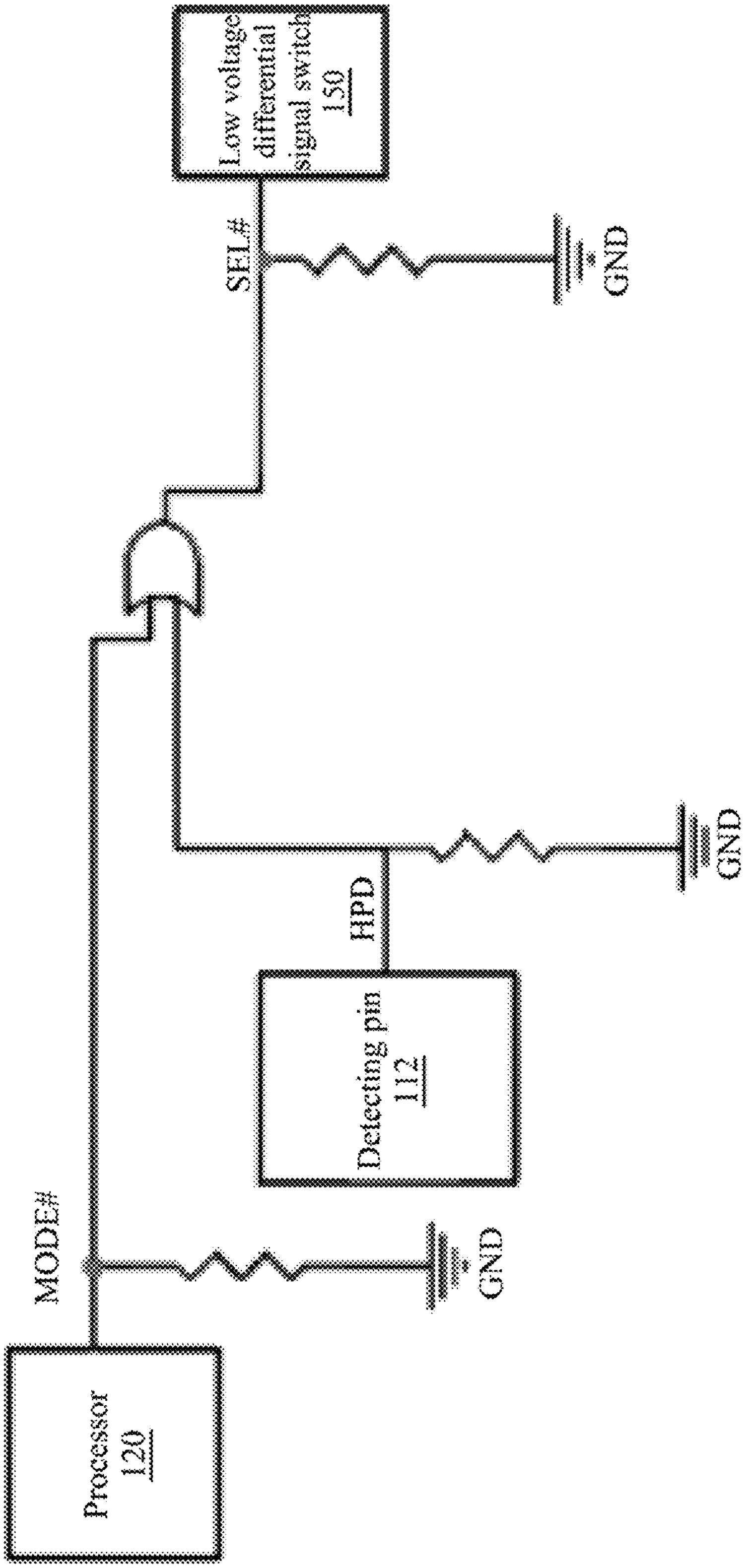
FIG. 5 shows a schematic circuit diagram of a detecting pin, a processor, and a low voltage differential signal switch of FIG. 1 according to embodiments of the present invention.

FIG. 5 shows a schematic circuit diagram of the detecting pin 112, the processor 120, and the low voltage differential signal switch 150 of FIG. 1 according to embodiments of the present invention. The logic of the truth table of the low voltage differential signal switch 150 as shown in FIG. 36 is the same as the logic of the truth table of the detecting pin 112 as shown in FIG. 4. Since the tablet computer 100 of the embodiment of the present invention can include the dip switch 180, the dip switch 180 can control the processor 120 to output a switching signal MODE#. When the low voltage differential signal switch 150 receives the switching signal, the low voltage differential signal switch 150 changes the tablet computer 100 into the external device mode. In addition, when the external device 900 connects to the external device input interface 110, the HPD signal of the detecting pin 112 is at a high level state. When the low voltage differential signal switch 150 receives the high level HPD signal, the low voltage differential signal switch 150 changes the tablet computer 100 into the external device mode. Since the processor 120 and the detecting pin 112 are electrically coupled to an OR circuit, regardless of whether the processor 120 outputs the switching signal MODE# or the HPD signal is at a high level state, the signal SEL# is at a high level state such that the low voltage differential signal switch 150 will change the tablet computer 100 into the external device mode.

It is noted that the embodiment of the present invention illustrates that the tablet computer 100 includes both the detecting pin 112 and the dip switch 180. However, in another embodiment, the tablet computer 100 can include one of either the detecting pin 112 or the dip switch 180.

Figure 6:
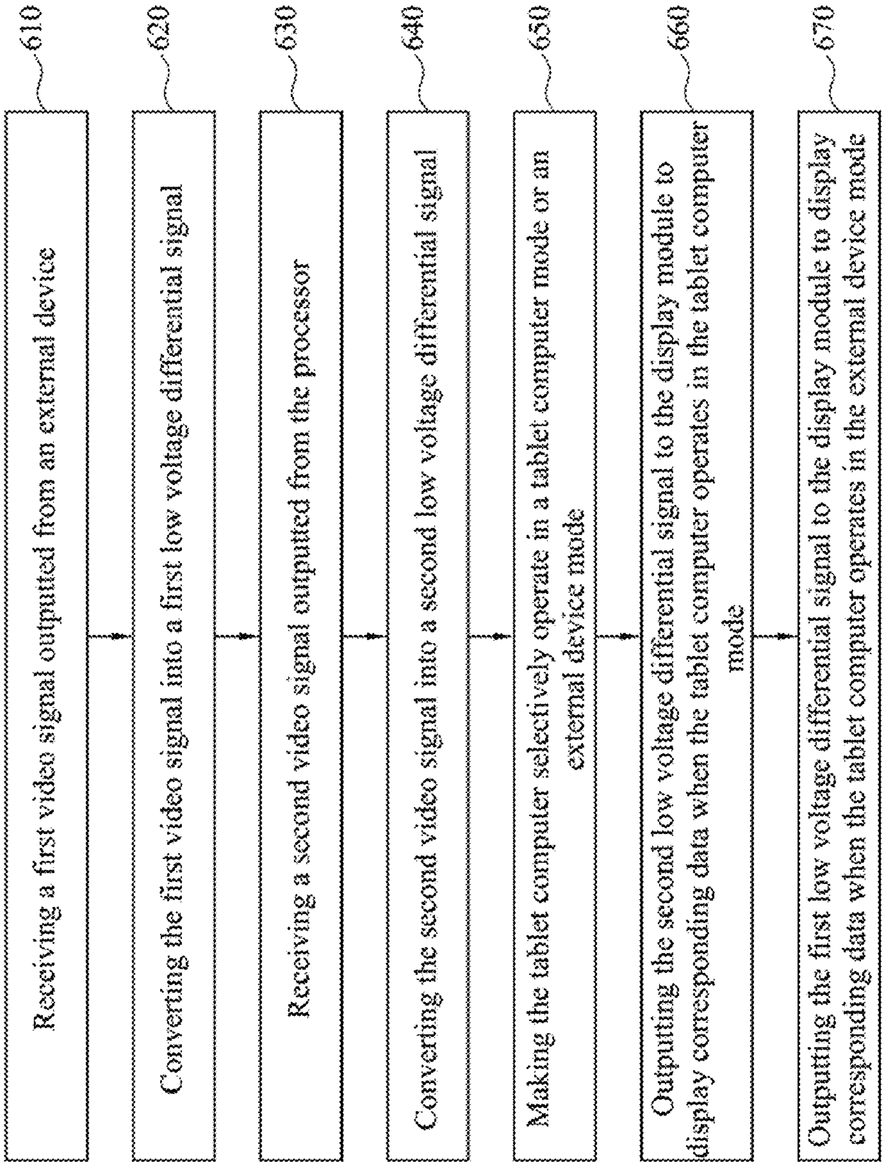
FIG. 6 shows a flow diagram of a method for controlling a tablet computer according to embodiments of the present invention.

FIG. 6 shows a flow diagram of a method for controlling a tablet computer according to embodiments of the present invention. As shown in FIG. 6, the method for controlling a tablet computer 600 includes the following steps:

step 610: receiving a first video signal outputted from external device;

step 620: converting the first video signal into a first low voltage differential signal;

step 630: receiving a second video signal outputted from a processor;

step 640: converting the second video signal into a second low voltage differential signal;

step 650: making the tablet computer selectively operate in a tablet computer mode or an external device mode;

step 660: outputting the second low voltage differential signal to a display module to display corresponding data when the tablet computer operates in the tablet computer mode;

step 670: outputting the first low voltage differential signal to the display module to display corresponding data when the tablet computer operates in the external device mode.

For better understanding the method for controlling the tablet computer 600 of the present invention, reference is made to both FIGS. 1 and 6, and the method 600 is described in relation to the configuration shown in FIG. 1.

In step 610, the external device input interface 110 receives the first video signal outputted from the external device 900.

Next, in step 620, the first low voltage differential signal converter 130 converts the first video signal into a first low voltage differential signal. In step 630, the second low voltage differential signal converter 170 receives a second video signal outputted from the processor 120, and in step 640, the second low voltage differential signal converter 170, converts the second video signal into a second low voltage differential signal In step 650, in a first condition, the dip switch 180 is used to control the processor 120 to output a switching signal. When the low voltage differential signal switch 150 receives the switching signal the low voltage differential signal switch 150 changes the tablet computer 100 into an external device mode. Ina second condition, the detecting pin 112 is used to detect whether the external device 900 is connected to the external device input interface 110. When the external device 900 is connected to the external device input interface 110 the low voltage differential signal switch 150 changes the tablet computer 100 into the external device mode. If the first condition and second condition are not satisfied, the tablet computer 100 operates in the tablet computer mode. Through such a mechanism, the tablet computer 100 can selectively operate in the tablet computer mode or the external device mode.

In addition, when the tablet computer 100 operates in the tablet computer mode, the low voltage differential signal switch 150 outputs the second low voltage differential signal to the display module 140 for displaying corresponding data. When the tablet computer 100 operates in the external device mode, the low voltage differential signal switch 150 outputs the first low voltage differential signal to the display module 140 for displaying corresponding data.

Hence, when any external device 900 is connected to the external device input interface 110, the method for controlling a tablet computer 600 can control the tablet computer 100 to selectively operate in the tablet computer mode or the external device mode, thereby addressing the problem of conventional switch systems only enabling switching between compatible notebook computers and tablet computers.

In one embodiment of the present invention, the method for controlling a tablet computer 600 further includes the steps of:

receiving a touch signal;

when the tablet computer operates in the tablet computer mode, outputting the touch signal to the processor; and when the tablet computer operates in the external device mode, outputting the touch signal to the external device.

In foregoing steps, the display module 140 generates the touch signal according to touch events. When the tablet computer 100 operates in the tablet computer mode, the touch signal switch 190 outputs the touch signal to the processor 120. When the tablet computer 100 operates in the external device mode, the touch signal switch 190 outputs the touch signal to the external device 900. In addition, when the tablet computer 100 operates in the external device mode, the touch detection function of the display module 140 of the tablet computer 100 can be used at the same time, and as a result, an external input device (for example, a mouse or a keyboard) is unneeded.

Those having skill in the art will appreciate that the method for controlling a tablet computer 600 can be performed with software, hardware, and/or firmware. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Those skilled in the art will recognize that optical aspects of implementations will typically employ optically oriented hardware, software, and or firmware.

In addition, those skilled in the art will appreciate that each of the steps of the method for controlling a tablet computer 600 named after the function thereof is merely used to describe the technology in the embodiment of the present invention in detail. Therefore, combining the steps of said method into one step, dividing the steps into several steps, or rearranging the order of the steps is within the scope of the embodiment in the present invention.

In view of the foregoing embodiments of the present invention, many advantages of the present invention are now apparent. The embodiments of the present invention provide a tablet computer and a method for controlling the same which address the problem of conventional switch systems that enable switching only between compatible notebook computers and tablet computers since when any external device 900 is connected to the external device input interface 110, the tablet computer 100 can be selectively switched between the tablet computer mode or the external device mode. Moreover, when the tablet computer of the present invention operates in the external device mode, the tablet computer 100 is operated through the processor of the external device 900. Such operation addresses the problem of difficulties in developing hardware resulting from processor configuration differences between the tablet computer 100 and the external device 900.

In addition, when the tablet computer operates in the external device mode, the touch function of the tablet computer 100 can be used at the same time, and as a result, an external input device (for example, a mouse or a keyboard) is unneeded.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A method for controlling a tablet computer, the tablet computer having a processor and a display module and being capable of selectively operating in a tablet computer mode or an external device mode, the method comprising:

receiving a first video signal outputted from an external device;

converting the first video signal into a first low voltage differential signal;

receiving a second video signal outputted from the processor;

converting the second video signal into a second low voltage differential signal;

outputting the second low voltage differential signal to the display module to display corresponding data when the tablet computer operates in the tablet computer mode, and outputting the first low voltage differential signal to the display module to display corresponding data when the tablet computer operates in the external device mode;

receiving a touch signal; and when the tablet computer operates in the tablet computer mode, outputting the touch signal to the processor, and when the tablet computer operates in the external device mode, outputting the touch signal to the external device.

2. The method for controlling the tablet computer according to claim 1, wherein the step of making the tablet computer selectively operate in the tablet computer mode or the external device mode comprises receiving a switching signal outputted from the processor to make the tablet computer operate in the external device mode.

3. The method for controlling the tablet computer according to claim 1, wherein the step of making the tablet computer selectively operate in the tablet computer mode or the external device mode comprises:

detecting whether the tablet computer is connected to the external device; and when the tablet computer is connected to the external device, making the tablet computer operate in the external device mode.

4. A tablet computer, comprising:

an external device input interface configured for connecting to an external device and receiving a first video signal outputted from the external device;

a first low voltage differential signal converter electrically coupled to the external device input interface and configured for converting the first video signal into a first low voltage differential signal;

a processor configured for outputting a second video signal;

a second low voltage differential signal converter electrically coupled to the processor and configured for converting the second video signal into a second low voltage differential signal; and a low voltage differential signal switch electrically coupled to the first low voltage differential signal converter and the second low voltage differential signal converter, wherein when the tablet computer operates in a tablet computer mode, the low voltage differential signal switch outputs the second low voltage differential signal, and when the tablet computer operates in an external device mode, the low voltage differential signal switch outputs the first low voltage differential signal; and a display module electrically coupled to the low voltage differential signal switch and configured for displaying corresponding data based on the first low voltage differential signal or the second low voltage differential signal outputted from the low voltage differential signal switch;

wherein the display module is a touch display module configured for sensing touch events, and the display module generates a touch signal based on the touch events, wherein the tablet computer further comprises a touch signal switch electrically coupled to the touch display module, the processor, and the external device input interface, and the touch signal switch is configured for receiving the touch signal, wherein when the tablet computer operates in the tablet computer mode, the touch signal switch transmits the touch signal to the processor, and when the tablet computer operates in the external device mode, the touch signal switch transmits the touch signal to the external device via the external device input interface.

5. The tablet computer according to claim 4, wherein when the tablet computer operates in the external device mode, the tablet computer is operated through a processor of the external device.

6. The tablet computer according to claim 4, wherein when the tablet computer operates in the tablet computer mode, the tablet computer is operated through the processor.

7. The tablet computer according to claim 4, further comprising:

a dip switch electrically coupled to the processor and configured for controlling the processor to output a switching signal, wherein when the low voltage differential signal switch receives the switching signal, the low voltage differential signal switch changes the tablet computer into the external device mode.

8. The tablet computer according to claim 4, wherein the external device input interface is electrically coupled to the low voltage differential signal switch, and the external device input interface comprises a detecting pin configured for detecting whether the external device is connected to the external device input interface, wherein when the external device is connected to the external device input interface, the low voltage differential signal switch changes the tablet computer into the external device mode.

* * * * *